US012650100B1

(12) United States Patent
Swenson et al.

(10) Patent No.: US 12,650,100 B1
(45) Date of Patent: Jun. 9, 2026

(54) METHODS AND SYSTEMS FOR PROPELLANT RECONDITIONING FOR SHORT-DURATION THRUSTERS BURNS

(71) Applicant: Blue Origin Manufacturing, LLC, Huntsville, AL (US)

(72) Inventors: Kevin Andrew Swenson, Seattle, WA (US); Jeffrey Yearsley, Parker, CO (US); Ethan C. Culler, Centennial, CO (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 19/067,125

(22) Filed: Feb. 28, 2025

(51) Int. Cl.
| | |
|---|---|
| *F02K 9/58* | (2006.01) |
| *B64G 1/40* | (2006.01) |
| *F02K 9/42* | (2006.01) |
| *F02K 9/50* | (2006.01) |
| *F02K 9/60* | (2006.01) |

(52) U.S. Cl.
CPC .............. *F02K 9/58* (2013.01); *B64G 1/401* (2013.01); *B64G 1/4022* (2023.08); *B64G 1/4024* (2023.08); *F02K 9/425* (2013.01); *F02K 9/50* (2013.01); *F02K 9/605* (2013.01)

(58) Field of Classification Search
CPC ... F02K 9/42; F02K 9/425; F02K 9/50; F02K 9/58; F02K 9/44; B64G 1/401; B64G 1/402; B64G 1/4024; F02C 7/232
See application file for complete search history.

(56) References Cited

U.S. PATENT DOCUMENTS

| | | | | |
|---|---|---|---|---|
| 6,047,541 A | * | 4/2000 | Hampsten .............. | B64G 1/402 60/259 |
| 2024/0400234 A1 | * | 12/2024 | Kawaguchi ............ | B64G 1/402 |

* cited by examiner

*Primary Examiner* — Gerald L Sung
(74) *Attorney, Agent, or Firm* — Summit Patents, PC

(57) ABSTRACT

Systems and methods for reconditioning a small amount of propellant for a rocket thruster are disclosed. The propellant may be liquid hydrogen (LH2). Reconditioning LH2 propellant may involve ensuring the propellant has a favorable temperature and pressure for use in a thruster. Embodiments involve temperature and pressure management of the propellant. Reconditioning may be performed subsequent to a long-duration burn by a thruster or after long-term storage of the propellant, which may experience boiloff. For short-duration thruster burns, pressurizing a relatively large supply tank may be considered excessive in the sense that more effort than necessary is expended for this large-scale pressurization. Thus, the systems and methods described herein may avoid such large-scale pressurization and instead pressurize a relatively small propellant tank, which is sufficient for short-duration thruster burns and requires relatively little effort to pressurize.

19 Claims, 4 Drawing Sheets

| Action | Tank Valve | Pressure Valve | Vent Valve | Thruster Valve |
|---|---|---|---|---|
| First Engine Burn | Open | Closed | Closed | Open |
| Coast | Either | Closed | Closed | Closed |
| Recondition LH2 | Open | Closed | Open | Closed |
| Pressurize Run Tank | Closed | Open | Either | Closed |
| Short-Duration Burn | Closed | Closed | Either | Open |
| Disposal Burn | Closed | Open | Either | Open |

METHODS AND SYSTEMS FOR PROPELLANT RECONDITIONING FOR SHORT-DURATION THRUSTERS BURNS

BACKGROUND

Gaseous reactants, propellants, and utility gases like gaseous oxygen and hydrogen are used for a variety of functions in a space vehicle. Because oxygen and hydrogen are most often stored as cryogenic liquids, their change in temperature and resulting changes in pressure must be dealt with during their storage and utilization, such as in rocket engines. In addition, operations in low-gravity may require special attention to the behavior and dynamics of liquid and gas phases of the cryogenic liquids (e.g., propellants). Thus, demand continues for reliable propellant storage and delivery systems that have relatively low mass, energy efficiency, and simple manufacturability, while being operable in the confines and limited resources involved in space flight or other space missions.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
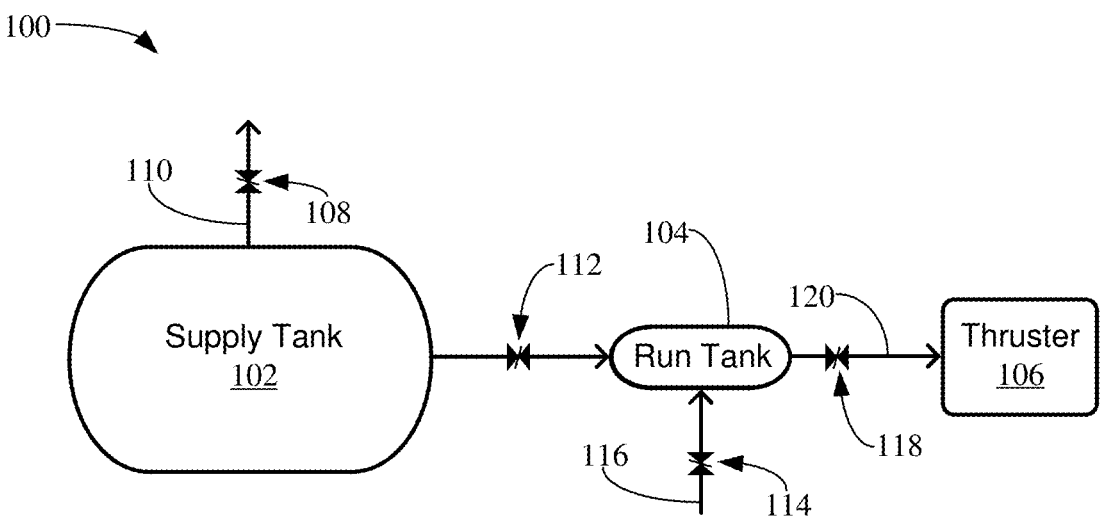
FIG. 1 is schematic flow diagram of a system for reconditioning a propellant, according to some embodiments.

This disclosure describes systems and methods for reconditioning a propellant for a thruster of a rocket. For example, such a propellant may be liquid hydrogen (LH2) or liquid oxygen (LO2). Reconditioning LH2 and LO2 propellants may involve a series of processes to ensure these propellants are in a functional state for use in a rocket thruster. Among other things, their temperature and pressure are important aspects that determine their functional state. Embodiments herein involve temperature and pressure management of propellants, wherein reconditioning may involve adjusting the pressure and/or temperature of the propellants. Such reconditioning may be performed subsequent to a long-duration burn by a thruster or after long-term storage of the propellant(s), which may experience boiloff.

Herein, a long-duration burn by a thruster generally describes a propellant-fed thruster operating for several minutes (e.g., five or ten minutes) or more. A short-duration burn by a thruster generally describes a propellant-fed thruster operating for less than a minute or two, though these are merely example time durations and claimed subject matter is not limited in this respect. For example, a rocket launch from a planet or moon may involve a long-duration burn, while changing a rocket's speed or direction in space or orbit may involve a short-duration burn.

Generally, after a long-duration burn, the temperature of a propellant in a relatively large supply tank that stores and provides the propellant to thrusters may likely be increased to a level that is too high for the thrusters to continue to function. In this case, reconditioning the propellant may involve decreasing the propellant's pressure in the supply tank to reduce the propellant's temperature, and then subsequently increasing the propellant's pressure in the supply tank. If, however, only short-duration thruster burns are planned, then pressurizing a relatively large supply tank may be considered excessive in the sense that more effort than necessary is expended for this large-scale pressurization. Thus, the systems and methods described herein may avoid such large-scale pressurization and instead pressurize a relatively small propellant tank, herein called a run tank, which is sufficient for short-duration thruster burns and requires relatively little effort to pressurize (and cool). For example, the methods include particular timing and sequences of opening and closing flow valves to and from various tanks.

In some embodiments, a method for reconditioning a propellant for a thruster of a rocket may include, during a long-duration burn by the thruster, providing the thruster with the propellant from a main tank via a run tank. Subsequent to the long-duration burn, the propellant may be vented from the main tank to cool and reduce the pressure of the propellant in the main tank and in the run tank. The method may further include closing a valve to prevent flow of the propellant between the main tank and the run tank, pressurizing the propellant in the run tank to obtain pressurized propellant having a pressure substantially greater than a pressure of the propellant in the main tank, and providing the thruster with the pressurized propellant in the run tank to perform a short-duration burn. For example, the propellant may be pressurized with an inert gas such as helium, which can be stored at ambient or cryogenic temperature conditions. In some cases, the run tank may have a volume that is less than about 10% of the volume of the main tank, though such recited percentages are merely particular examples and claimed subject matter is not limited in this respect. Generally, however, the run tank may be much smaller than the main tank (e.g., supply tank) so that relatively small "batches" of propellant may be conditioned or reconditioned for use in thrusters. This can avoid the much more demanding effort (and extensive use of on-board resources or consumables) of reconditioning the large main tank.

In some implementations, the method may also include, subsequent to the short-duration burn, opening the valve to allow flow of the propellant from the main tank to the run tank and at least partially filling the run tank with the flow of the propellant from the main tank. In some instances, before opening the (first) valve to allow flow of the propellant from the main tank to the run tank, a second valve between a source of pressurization and the run tank may be closed to discontinue pressurizing the propellant in the run tank. In this way, pressurization gas need not be used to pressurize the large main tank when the first valve is opened. The source of pressurization may be storage tanks that are at least partially filled with pressurized helium.

Next, the (first) valve may then be closed to stop flow of the propellant from the main tank to the run tank. The method may further include re-pressurizing the propellant in the run tank to obtain pressurized propellant and providing the thruster with the pressurized propellant in the run tank to perform a second short-duration burn. These latter steps may be repeated for third and subsequent short-duration thruster burns, for example.

In some implementations, the run tank may be side-mounted to the rocket, as described below. The rocket may have a cylindrical airframe and fins external to the cylindrical airframe, such that providing the thruster with the propellant from the main tank via the run tank comprises passing the propellant within a volume between the cylindrical airframe and one of the fins.

In other embodiments, a method for reconditioning a cryogenic propellant for a short-duration thruster burn of a rocket may include providing the cryogenic propellant to a run tank from a main tank that is being vented to i) cool the cryogenic propellant and ii) lower the pressure of the cryogenic propellant; closing a valve to prevent flow of the cryogenic propellant from the main tank to the run tank; while the valve is closed, pressurizing the cryogenic propellant in the run tank to obtain pressurized propellant having a pressure substantially greater than a pressure of the propellant in the main tank; and performing the short-duration thruster burn using the pressurized propellant in the run tank.

The method may further include, subsequent to performing the short-duration thruster burn, opening the valve to allow flow of the cryogenic propellant from the main tank to the run tank; at least partially filling the run tank with the flow of the cryogenic propellant from the main tank; re-closing the valve to stop flow of the cryogenic propellant from the main tank to the run tank; re-pressurizing the cryogenic propellant in the run tank to again obtain pressurized propellant; and performing a second short-duration thruster burn using the pressurized propellant in the run tank. Pressurizing the cryogenic propellant in the run tank may include opening a second valve between a helium storage tank and the run tank.

In some embodiments, a system may include a processor and a memory, the memory storing instructions that, when executed by the processor, cause the processor to control a first set of valves to provide a thruster of a rocket with propellant from a main tank via a run tank during a long-duration burn by the thruster. The processor may also control a second set of valves subsequent to the long-duration burn to vent the propellant from the main tank to cool and reduce pressure of the propellant in the main tank and in the run tank. Also, the processor may close an isolation valve (e.g., a tank valve) to prevent flow of the propellant between the main tank and the run tank and control a third set of valves to pressurize the propellant in the run tank to obtain pressurized propellant having a pressure substantially greater than a pressure of the propellant in the main tank. Moreover, the processor may control at least a portion of the first set of valves to provide the thruster with the pressurized propellant in the run tank for a short-duration burn.

Subsequent to the short-duration burn, the processor may open the isolation valve to allow flow of the propellant from the main tank to the run tank and, via control of the isolation valve, at least partially fill the run tank with the flow of the propellant from the main tank. The processor may close the isolation valve to stop flow of the propellant from the main tank to the run tank, control the third set of valves to re-pressurizing the propellant in the run tank to obtain pressurized propellant, and control at least a portion of the first set of valves to provide the thruster with the pressurized propellant in the run tank for a second short-duration burn.

At least a portion of the third set of valves may control a flow of helium between a helium storage tank and the run tank. The propellant may be hydrogen. In some implementations, the run tank may be side-mounted to the rocket. The rocket may have a cylindrical airframe and fins external to the cylindrical airframe. Accordingly, the propellant may pass within a volume between the cylindrical airframe and one of the fins while the first set of valves provides the thruster of the rocket with propellant from the main tank via the run tank during the long-duration burn.

FIG. 1 is schematic flow diagram of a system 100 for reconditioning a propellant, according to some embodiments. For example, the propellant may be LH2 or LO2. Herein, for sake of simplicity, the propellant is assumed to be LH2, though claimed subject matter is not so limited. System 100 may include, among other things, a relatively large supply tank 102, a run tank 104, and a thruster 106. A vent valve 108 may allow supply tank 102 to be vented, via a vent line 110, as described below. A tank valve 112 may control flow between supply tank 102 and run tank 104. A pressure valve 114 may control a flow of a pressurization gas via a pressurization line 116. A thruster valve 118 may control a flow of LH2 via a propellant supply line 120 to thruster 106 from run tank 104.

A method for reconditioning the LH2 propellant for thruster 106 may include a number of steps, which may start with a long-duration burn. For example, during a long-duration burn, thruster 106 may be supplied with LH2 from supply tank 102 (e.g., a main tank) via run tank 104. Subsequent to the long-duration burn, by controlling vent valve 108, the propellant may be vented from supply tank 102 to cool and reduce the pressure of the LH2 in the supply tank and, because tank valve 112 is open, in run tank 104. The method may further include closing tank valve 112 (e.g., an isolation valve) to prevent flow of the LH2 between the supply tank and the run tank. Next, pressure valve 114 may be opened to allow a pressurizing gas, such as helium, to flow into run tank 104 and pressurize the LH2 therein. The resulting pressure of the LH2 in the run tank may then be substantially greater than the pressure of the LH2 in supply tank 102 (since it may still be vented or was recently vented). Now the LH2 in the run tank is effectively reconditioned, having been pressurized and likely chilled to a cooler temperature by the influx of the pressurizing gas (e.g., helium). Accordingly, the reconditioned LH2 may be supplied to thruster 106 to perform a short-duration burn, for example.

Figure 2:
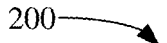
FIG. 2 is a table of states of valves of a system for reconditioning a propellant during various portions of a space flight, according to some embodiments.

FIG. 2 is a table 200 of example states (e.g., positions) of valves 108, 112, 114, and 118 of system 100 that reconditions a propellant during various portions of a space flight of a space vehicle, according to some embodiments. Stages of a space flight may, for example, include a launch from earth, which involves a first engine burn or long-duration burn. For this stage, tank valve 112 is open so that thruster 106 can receive LH2 from supply tank 102. The LH2 runs through run tank 104 as it flows from supply tank 102 to thruster 106, with thruster valve 118 open. For at least the reason that supply tank 102 and run tank 104 are pressurized sufficiently during the first engine burn, pressure valve 114 is closed. Vent valve 108 is also closed because the LH2 is sufficiently cold during the first engine burn and there is likely no need to expend LH2 (e.g., as a waste product) and lose pressure while doing so.

After an extended period of time, such as after the first engine burn or hours or more thereafter, the space vehicle may freely drift without acceleration in a coasting stage. Pressure valve 114 and vent valve 108 may remain closed and tank valve 112 may remain open. Thruster valve 118 may be closed to prevent LH2 leakage through thruster 106. During this stage, thruster 106 is not operated.

After some time has passed, LH2 propellant may be reconditioned, at least partially, by cooling the LH2 by venting. Accordingly, tank valve 112 and vent valve 108 may be opened so that LH2 in both the supply tank and the run tank may lose pressure and resultantly cool. Pressure valve 114 and thruster valve 118 remain closed while tank valve 112 is open.

LH2 in run tank 104 may be pressurized and thus fully reconditioned for use in thruster 106. To do so, tank valve 112 is closed so that LH2 in run tank 104 remains in the run tank without reverse flowing into supply tank 102. Tank valve 112 is also closed so that pressurization gas is only applied to run tank 104 and not applied to supply tank 102. In other words, pressure valve 114 is opened to allow pressurization gas to pressurize run tank 104 and tank valve 112 prevents the pressurization gas from flowing into supply tank 102. Thruster valve 118 remains closed. During this time, vent valve may be opened or closed.

Upon or after such pressurization of the run tank, a short-duration thruster (engine) burn may be performed by using the pressurized LH2 in the run tank. For this operation, tank valve 112 remains closed and thruster valve 118 is opened so that LH2 from the pressurized run tank can flow into thruster 106. Pressure valve 114 may be open if continuous pressure is to be applied to the LH2 in the run tank. Otherwise, pressure valve 114 may be closed so as to not use more pressurization gas than what is needed at the moment. Vent valve 108 may be opened or closed, since that part of the propellant supply system is isolated from the run tank (via closed tank valve 112).

In some implementations, at the end of a mission, for example, a disposal burn may be performed to eliminate propellants in the space vehicle. One way to perform a disposal burn is to run thruster 106 to use up all the LH2 in run tank 104. In this case, thruster valve 118 is open and pressure valve 114 may be opened to continue to apply pressure to the LH2 in the run tank. In some implementations, helium gas (GHe) may be applied to the run tank, via pressurization line 116, for purging the run tank. Tank valve 112 may be closed so that pressure (which may be needed for thruster operation) in the run tank is not lost to the large supply tank, which is at a much lower pressure. Also, vent valve 108 may be open or closed.

Figure 3:
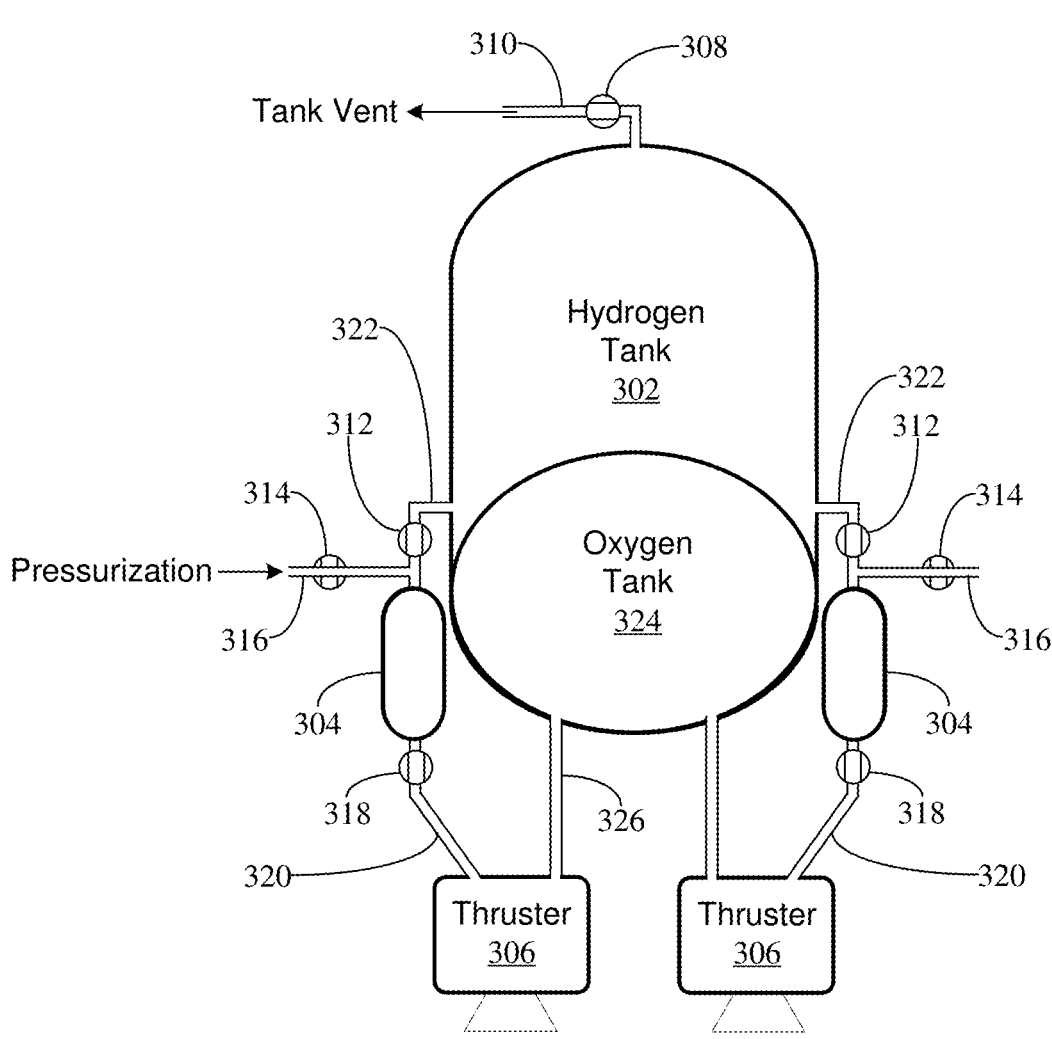
FIG. 3 is a cross-section schematic view of a portion of a system for reconditioning hydrogen propellant, according to some embodiments.

FIG. 3 is a cross-section schematic view of a portion of a system 300 configured to recondition hydrogen propellant (LH2), according to some embodiments. Portions of system 300, which may be in a rocket or other space vehicle, may function similar to or the same as system 100. For example, system 300 includes a hydrogen tank 302 (e.g., supply tank 102), a run tank 304 (e.g., 104), thrusters 306 (e.g., thruster 106), a vent valve 308 (e.g., 108), a vent line 310 (e.g., 110), a tank valve 312 (e.g., 112), a pressure valve 314 (e.g., 114), a pressurization line 316 (e.g., 116), a thruster valve 318 (e.g., 118), and a propellant supply line 320 (e.g., 120). System 300 also includes a tank supply line 322 that leads to tank valve 312 from hydrogen tank 302. System 300 also includes an oxygen tank 324 and a line 326 that carries the oxygen from the oxygen tank to thrusters 306.

As described above for system 100, a method for reconditioning hydrogen propellant for thruster operation may include a number of steps, which may start with a long-duration burn. For example, during the long-duration burn, valves 312 and 318 are open and thruster 306 may be supplied with hydrogen from hydrogen tank 302 (e.g., a main tank) via run tank 304. In other words, during a long-duration burn, along with lines 320 and 322, the run tank acts as a pathway for hydrogen to flow from hydrogen tank 302 to thruster 306. Thus, the pressure and temperature of the hydrogen in the run tank are substantially the same as in hydrogen tank 302.

Subsequent to the long-duration burn, after thruster valve 318 is closed, vent valve 308 may be opened to vent hydrogen tank 302 and run tank 304. This venting acts to cool and reduce the pressure of the hydrogen in the supply tank and the run tank. After some time has passed, tank valve 312 may be closed to isolate run tank 304 from hydrogen tank 302. Thus, flow of hydrogen between the hydrogen tank and the run tank is prevented. Accordingly, the pressure and temperature of hydrogen in the run tank are independent of the pressure and temperature of the hydrogen in the hydrogen tank. Next, pressure valve 314 may be opened to allow a pressurizing gas, such as helium, to flow into run tank 304 and pressurize the hydrogen therein. Depending on the temperature of the pressurizing gas, its influx into the run tank may also cool the hydrogen therein. The resulting pressure of the hydrogen in the run tank may then be substantially greater than the pressure of the hydrogen in supply tank 302 (since it may still be vented or was recently vented). Now the hydrogen in the run tank is effectively reconditioned, having been pressurized and likely chilled to a cooler temperature by the influx of the pressurizing gas (e.g., helium). Accordingly, the reconditioned hydrogen may be supplied to thruster 306 to perform a short-duration burn, for example. The steps performed subsequent to the long-duration burn may be repeated for reconditioning relatively small "batches" of hydrogen for additional short-duration burns. Though hydrogen is used in this example embodiment, these steps may be instead performed with a different liquid or gas, such as another propellant or an oxidizer.

Figure 4:
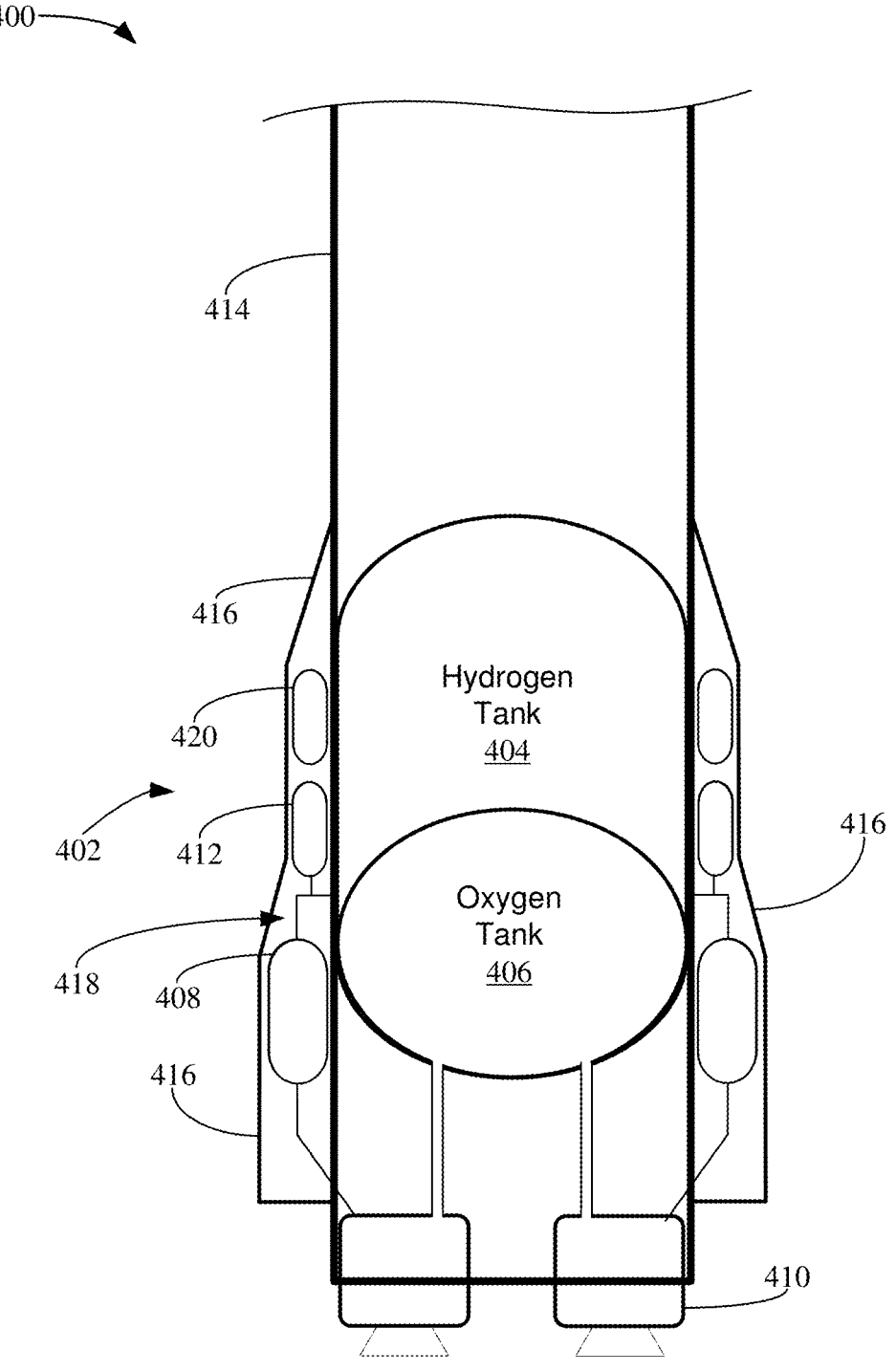
FIG. 4 is a cross-section schematic view of a portion of a rocket that includes a system for reconditioning hydrogen propellant, according to some embodiments.

FIG. 4 is a cross-section schematic view of a portion of a rocket 400 that includes a system 402 that is configured to recondition hydrogen propellant, according to some embodiments. For example, system 402 may be the same as or similar to system 300. System 402 may include, among other things, a hydrogen tank 404, an oxygen tank 406, a run tank 408, thrusters 410, and a pressurization tank 412. At least a portion of system 402 may be external to a cylindrical airframe 414 of the rocket. For example, run tank 408 may be side-mounted on the outside of cylindrical airframe 414 but underneath aerodynamic fins 416 that protrude from cylindrical airframe 414. Such a configuration may result in hydrogen propellant from hydrogen tank 404 and run tank 408 passing within a volume 418 between cylindrical airframe 414 and one of the fins 416 during operation of thrusters 410 for a long-duration burn. In contrast, such a configuration may result in hydrogen propellant from run tank 408 passing within volume 418 during operation of thrusters 410 for a short-duration burn. Various other tanks and/or components 420, such as piping and valves, just to name a few examples, may also be located in volume 418.

Figure 5:
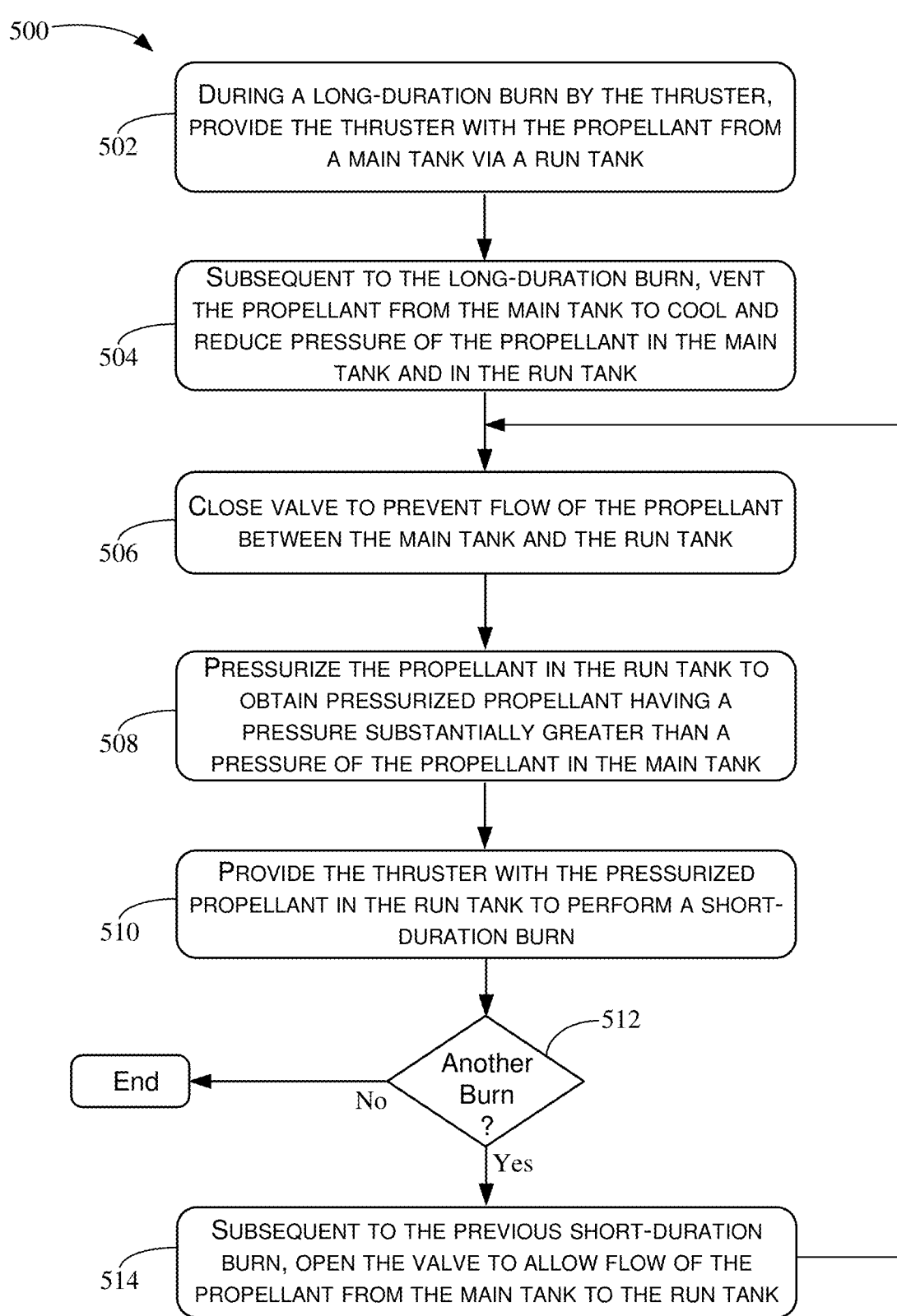
FIG. 5 is a flow diagram of an example process for reconditioning a propellant, according to some embodiments.

FIG. 5 is a flow diagram of an example process 500 for reconditioning a propellant, according to some embodiments. For example, the process may be performed by an operator such as a crew member, an electronic controller, a computer processing system following computer-executable instructions, or a combination thereof.

At 502, the operator may, during a long-duration burn by the thruster, provide the thruster with the propellant from a main tank (e.g., 102 or 302) via a run tank (e.g., 104 or 304). At 504, subsequent to the long-duration burn, the operator may vent the propellant from the main tank to cool and reduce the pressure of the propellant in the main tank and in the run tank. At 506, the operator may close a tank valve (e.g., 112 or 312) to prevent flow of the propellant between the main tank and the run tank. At 508, the operator may pressurize the propellant in the run tank to obtain pressurized propellant having a pressure substantially greater than a pressure of the propellant in the main tank. At 510, the operator may provide the thruster with the pressurized propellant in the run tank to perform a short-duration burn. For example, the propellant may be pressurized with cryogenic helium. In some cases, the run tank may have a volume that is less than about 10% of the volume of the main tank, though claimed subject matter is not limited in this respect.

In some implementations, process 500 may proceed to 512 where the operator may determine if another burn is to occur. If so, then the operator, at 514, may open the tank valve to allow flow of the propellant from the main tank to the run tank so that the run tank is at least partially filled with the flow of the propellant from the main tank. In some instances, before opening the tank valve to allow flow of the propellant from the main tank to the run tank, the operator may close a second valve between a source of pressurization and the run tank to discontinue pressurizing the propellant in the run tank. In this way, pressurization gas need not be used to pressurize the large main tank when the first valve is opened. The source of pressurization may be storage tanks that are at least partially filled with pressurized helium, for example. Subsequent to 514, process 500 may return to 506 to recondition propellant for additional short-duration burns.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A method for reconditioning a propellant for a thruster of a rocket, the method comprising:
   during a first thruster burn by the thruster, providing the thruster with the propellant from a main tank via a run tank;
   subsequent to the first thruster burn, venting the propellant from the main tank to cool and reduce a pressure of the propellant in the main tank and in the run tank;
   closing a valve to prevent flow of the propellant between the main tank and the run tank;
   pressurizing the propellant in the run tank to obtain pressurized propellant having a pressure greater than a pressure of the propellant in the main tank; and
   providing the thruster with the pressurized propellant in the run tank to perform a second thruster burn by the thruster, wherein the second thruster burn has a duration shorter than a duration of the first thruster burn.

2. The method of claim 1, further comprising;
   subsequent to the second thruster burn, opening the valve to allow flow of the propellant from the main tank to the run tank;
   at least partially filling the run tank with the flow of the propellant from the main tank;
   closing the valve to stop flow of the propellant from the main tank to the run tank;
   re-pressurizing the propellant in the run tank to obtain a re-pressurized propellant; and
   providing the thruster with the pressurized propellant in the run tank to perform a subsequent thruster burn by the thruster, wherein the subsequent thruster burn has a duration shorter than the duration of the first thruster burn.

3. The method of claim 2, further comprising:
   before opening the valve to allow flow of the propellant from the main tank to the run tank, closing a second valve between a source of pressurization and the run tank to discontinue pressurizing the propellant in the run tank.

4. The method of claim 3, wherein the source of pressurization comprises pressurized storage tanks.

5. The method of claim 4, wherein the pressurized storage tanks contain pressurized helium.

6. The method of claim 1, wherein the propellant is cryogenic hydrogen.

7. The method of claim 1, wherein the run tank has a volume that is less than about 10% of the volume of the main tank.

8. The method of claim 1, wherein the run tank is side-mounted to the rocket.

9. The method of claim 1, wherein the rocket has a cylindrical airframe and fins external to the cylindrical airframe, and wherein providing the thruster with the propellant from the main tank via the run tank comprises passing the propellant within a volume between the cylindrical airframe and one of the fins.

10. A method for reconditioning a propellant for a thruster of a rocket, the method comprising:
    providing the thruster with the propellant from a main tank via a run tank during a first thruster burn;
    after the first thruster burn, venting the main tank to reduce a pressure of the propellant in the main tank and in the run tank;
    closing a valve to isolate the run tank from the main tank to prevent flow of the propellant between the main tank and the run tank;
    introducing a pressurizing gas into the run tank to obtain pressurized propellant having a pressure greater than the pressure of the propellant in the main tank; and
    supplying the thruster with the pressurized propellant from the run tank to perform a disposal burn; wherein performing the disposal burn comprises operating the thruster until substantially all the propellant in the run tank is consumed.

11. The method of claim 10, further comprising supplying helium through a pressure valve to the run tank while the thruster performs the disposal burn.

12. The method of claim 10, further comprising purging the run tank with helium following the disposal burn.

13. The method of claim 10, wherein the disposal burn is performed at an end of a mission as a terminal operation to deplete the propellant remaining in the run tank.

14. The method of claim 10, wherein the run tank has a volume that is less than about ten percent of the volume of the main tank.

15. The method of claim 10, wherein the propellant comprises liquid hydrogen.

16. The method of claim 10, wherein venting the main tank comprises opening a vent valve coupled to the main tank to release vapor from the main tank.

17. The method of claim 10, wherein venting the main tank comprises cooling the propellant in the run tank prior to the disposal burn.

18. The method of claim 10, wherein closing the valve comprises closing an isolation valve arranged between the main tank and the run tank.

19. The method of claim 10, wherein the run tank is side-mounted to the rocket.

\* \* \* \* \*